United States Patent [19]

Kiefer et al.

[11] Patent Number: 4,923,237

[45] Date of Patent: May 8, 1990

[54] REFRIGERATED TRUCK HAVING A BODY MOVABLE RELATIVE TO A CHASSIS

[75] Inventors: Kevin W. Kiefer, Prior Lake; Cynthia J. Satterness, Bloomington, both of Minn.

[73] Assignee: Thermo King Corporation, Minneapolis, Minn.

[21] Appl. No.: 375,228

[22] Filed: Jul. 3, 1989

[51] Int. Cl.⁵ .............................................. B62D 27/00
[52] U.S. Cl. .................................. 296/24.1; 296/35.1; 296/39.3; 62/440; 414/495
[58] Field of Search ............... 296/39.3 X, 35.10, 24.1; 414/495 X; 62/440 X, 441

[56] References Cited

U.S. PATENT DOCUMENTS

| | | | |
|---|---|---|---|
| 1,907,217 | 5/1933 | Rott | 296/24.1 |
| 2,680,957 | 6/1954 | Adams | 62/237 |
| 2,968,933 | 1/1961 | Pfeifer et al. | 62/176.1 |
| 3,181,311 | 5/1965 | Latzer | 296/39.3 |
| 3,210,957 | 10/1965 | Rutishauser et al. | 62/255 |
| 3,440,834 | 4/1969 | Hirai et al. | 62/409 |
| 3,687,321 | 8/1972 | Goodhart et al. | 414/495 |
| 3,777,506 | 12/1973 | Hergatt et al. | 62/262 |
| 4,012,922 | 3/1977 | Falensky | 62/240 |
| 4,323,110 | 4/1982 | Rubbright et al. | 162/2 |

*Primary Examiner*—Robert R. Song
*Attorney, Agent, or Firm*—D. R. Lackey

[57] ABSTRACT

A refrigerated truck having a chassis supported by wheels, and a truck body. The truck body is mounted for movement relative to the chassis, between a first position adjacent to the chassis and a second position above the first position. A refrigeration system is mounted on the chassis having discharge and return air ducts in air flow communication with air supply and return air ducts, respectively, associated with the truck body, in the first position of the truck body. Movement of the truck body to the second position automatically and completely separates the air ducts of the truck body from the air ducts of the refrigeration system, while deenergizing the refrigeration system.

6 Claims, 2 Drawing Sheets

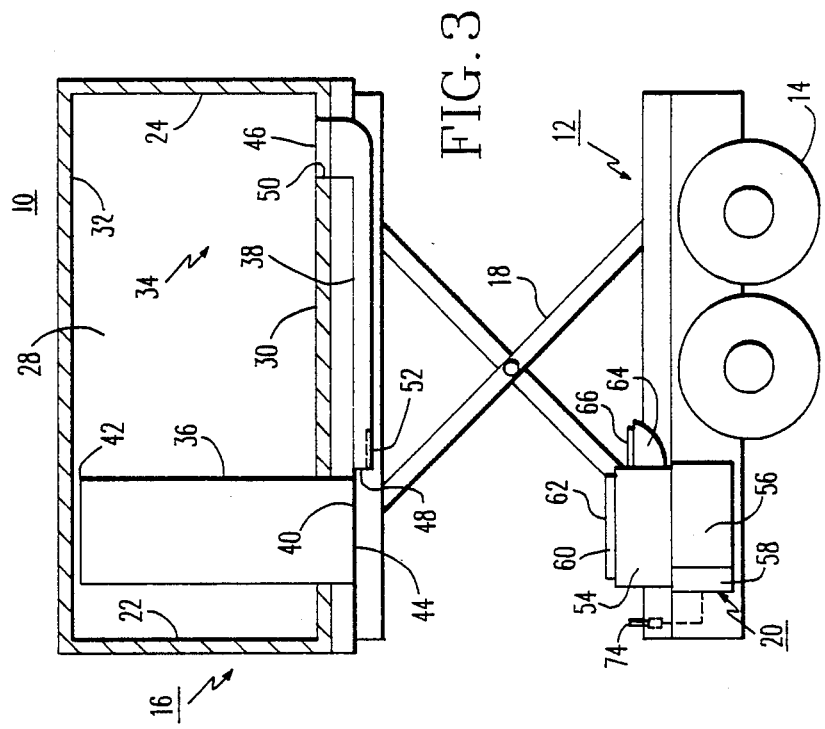
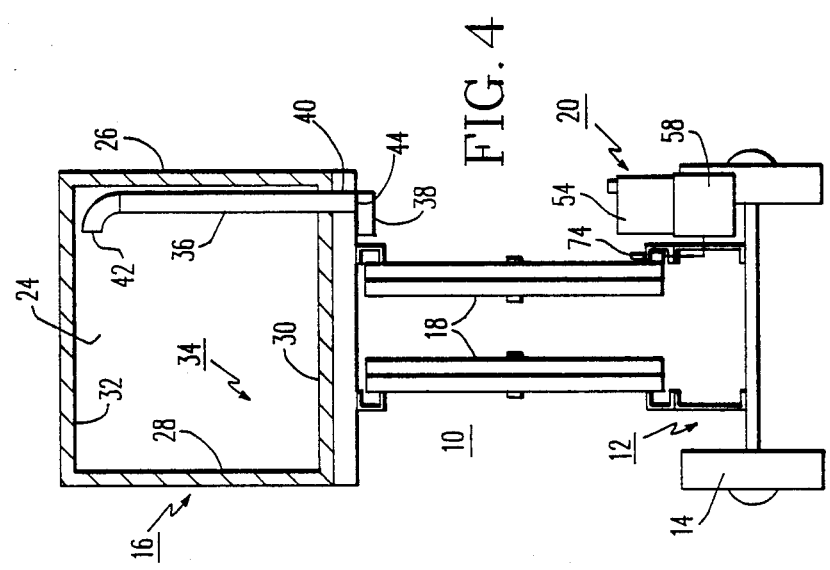

REFRIGERATED TRUCK HAVING A BODY MOVABLE RELATIVE TO A CHASSIS

TECHNICAL FIELD

The invention relates in general to refrigerated trucks, and more specifically to refrigerated trucks in which a truck body is movable relative to a support chassis.

BACKGROUND ART

Airline food service trucks have a refrigerated truck body mounted on a chassis via a scissors lift mechanism. If the refrigeration system is mounted on the truck body, the truck body is exceedingly top heavy, especially in the elevated position. If the refrigeration system is mounted on the truck chassis with remote evaporators in the truck body, flexible refrigerant and electrical lines are required, which present a maintenance problem. It would be desirable, and it is the object of the present invention, to remove as much weight from the truck body as possible, so refrigerated airline food service trucks are not so top heavy, and to eliminate the need for the maintenance intensive flexible refrigerant and electrical lines between the truck chassis and truck body.

SUMMARY OF THE INVENTION

Briefly, the present invention is a refrigerated truck of the airline food service type which includes a truck chassis, an insulated truck body, and a refrigeration system. The truck body is mounted on the truck chassis via a scissors lift mechanism, such that the truck body is movable between a first position immediately adjacent to the truck chassis, to a second position which is vertically spaced above the first position. The insulated truck body is made as light as possible by removing all active elements of the refrigeration system therefrom.

The only elements of the refrigeration system mounted on or carried by the truck body are supply and return air ducts. The supply air duct extends from the floor to the ceiling of the truck body, preferably adjacent to one end of the truck body. The supply air duct has an air entrance end which extends through the floor of the truck body, defining a downwardly facing opening, and an air exit end which defines an opening inside the truck body, adjacent to the truck ceiling.

The return air duct runs through or below the floor of the truck body, having an air entrance end which defines an opening which is in air flow communication with the inside of the truck body. The air entrance end is preferably located adjacent to the end of the truck body which is opposite to the end associated with the supply air duct, for uniform flow of conditioned air through the truck body. The return air duct has an exit end close to the entrance end of the supply air duct, with the exit end defining a downwardly facing opening.

The remaining elements of the refrigeration system are entirely mounted on the truck chassis, including an evaporator section having discharge and return air ducts having upwardly facing openings in alignment with the downwardly facing entrance opening to the supply air duct and the downwardly facing exit opening to the return air duct, respectively.

When the truck body is moved downwardly to the first or lowered position thereof, the discharge air duct of the refrigeration system telescopically engages the supply air duct of the truck body, with a suitable gasket sealing the interface. The return air duct of the refrigeration system also telescopically engages the return air duct of the truck body, with a suitable gasket sealing the interface. A suitable detector switch carried by the truck chassis provides a signal for refrigeration control that the truck body is in the first position, enabling the operation of the refrigeration system.

When the truck body is moved upwardly to the second or elevated position thereof, the supply air duct of the truck body automatically separates from the discharge air duct of the refrigeration system, and the return air duct of the truck body automatically separates from the return air duct of the refrigeration system. The detector switch is actuated when the truck body moves away from the first position, preventing operation of the refrigeration system until the truck body returns to the first position.

BRIEF DESCRIPTION OF THE DRAWINGS

The invention will become more apparent by reading the following detailed description in conjunction with the drawings, which are shown by way of example only, wherein:

FIG. 3 is a side elevational view of the refrigerated truck shown in FIGS. 1 and 2, with the movable truck body shown in an elevated or second position relative to the support chassis; and FIG. 4 is an end elevational view of the refrigerated truck shown in FIG. 3, with the truck body in the elevated second position.

DESCRIPTION OF PREFERRED EMBODIMENTS

Figure 1:
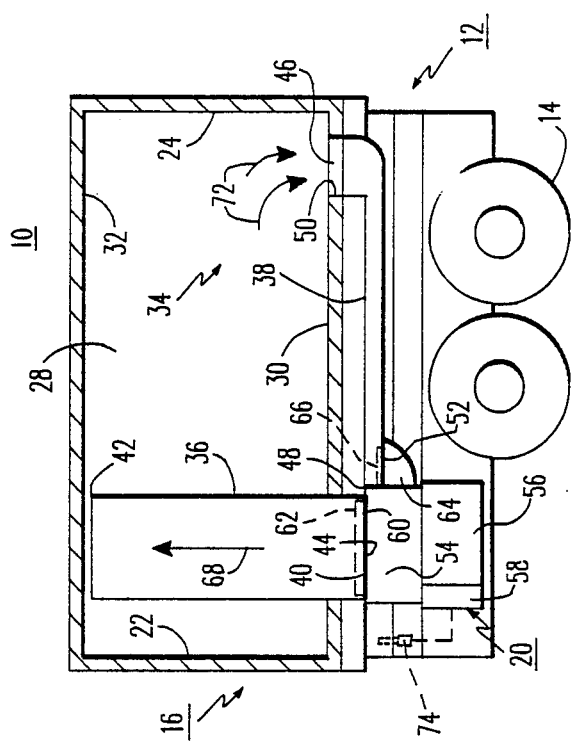
FIG. 1 is a side elevational view, partially in section, of a refrigerated truck constructed according to the teachings of the invention, including a movable truck body shown in a lowered or first position relative to a support chassis.

Referring now to the drawings, and to FIG. 1 in particular, there is shown a refrigerated truck 10 constructed according to the teachings of the invention. Truck 10 may be a straight truck, or, as illustrated, it may be in the form of a trailer which is pulled by a suitable tractor. Truck 10 includes a chassis 12 having a plurality of wheels 14 mounted thereon, a truck body 16, a scissors lift mechanism 18, and a refrigeration system 20.

Figure 2:
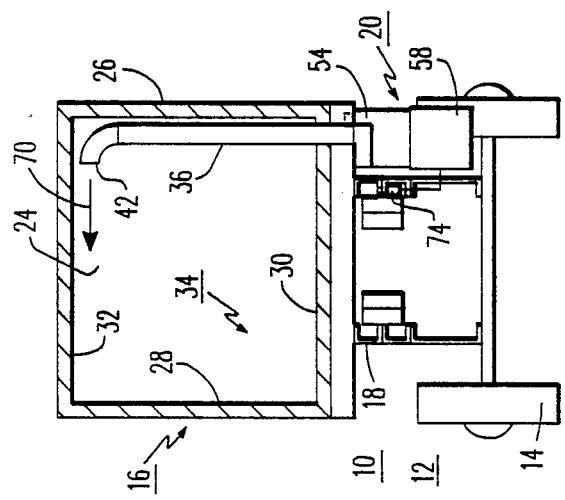
FIG. 2 is an end elevational view of the refrigerated truck shown in FIG. 1, shown partially in section, with the truck body in the lowered first position.

Scissors mechanism 18 mounts truck body 16 for movement between first and second positions, with the first position being shown in FIGS. 1 and 2, wherein the truck body 16 essentially rests upon the chassis 12, and with the second position being shown in FIGS. 3 and 4, wherein the truck body 16 is lifted or elevated vertically above the first position to a height which permits transfer of food between truck body 16 and an airplane.

The truck body 16 includes first and second longitudinal ends 22 and 24, first and second sides 26 and 28, a floor 30 and a ceiling 32, all of which are suitably thermally insulated to define a served space 34 to be provided with conditioned air by refrigeration system 20.

Truck body 16 is devoid of any active refrigeration components, which makes the truck body 16 as light as possible. This also means that the need for flexible refrigeration hoses and electrical wiring is also eliminated, eliminating a source of costly maintenance. The only refrigeration related components mounted on or carried by truck body 16 are an air supply duct 36 and a return air duct 38, which add very little to the weight of the truck body, and which occupy very little of the served space 34.

More specifically, the air supply duct 36 is a vertically oriented, elongated sheet metal structure having first and second ends 40 and 42, respectively. In a preferred embodiment of the invention, duct 36 is mounted immediately adjacent to one of the side walls, such as the first side wall 26, and adjacent to one of the longitudinal ends, such as the first end 22.

Duct 36 has a substantially rectangular cross-sectional configuration, with the width dimension in the direction between the first and second ends 22 and 24 of the served space 34 being much greater than the depth dimension in the direction between the first and second side walls 26 and 28, to provide minimal intrusion into the served space occupied by food to be preserved.

The first end 40 of air supply duct 36 is located below the level of the floor 30, with duct 36 extending downwardly through an opening in floor 30. The first end 40 defines a downwardly facing opening 44. The second end 42 is just below ceiling 32, and it curves towards the center of the served space 34, such that air which enters the downwardly facing opening 44 is directed from an opening defined by the second end 42 towards the opposite side wall 28. A side wall is selected for the preferential location for air supply duct 36 because the air supply duct is preferably disposed directly above refrigeration unit 20, and there will usually be more space for mounting refrigeration unit 20 on a side of chassis 12, rather than on an a longitudinal end of the chassis. However, if room is provided for mounting refrigeration unit 20 adjacent to a longitudinal end of the chassis 12, then duct 36 may be mounted on an end wall instead of a side wall, and the second end 42 of duct 36 would then direct conditioned air towards the opposite end of the served space 34.

The return air duct 38 is a horizontally oriented, elongated sheet metal structure having first and second ends 46 and 48. Duct 38 is mounted in or below floor 30, adjacent to the same side of truck body 16 associated with the air supply duct 36, which is the first side 36 in the example set forth in the Figures. The first end 46 bends upwardly for registry with an opening 50 in floor 30, with the first end 46 defining an air entrance opening which is essentially contiguous with opening 50. Opening 50 is preferably located adjacent to the end of truck body 16 which is opposite to the end associated with the air supply duct 36, which in this instance would be end 24. By locating the discharge air exit end 42 of the air supply duct 36 and the return air entrance end 46 of the return air duct 38 at opposite ends of the served space 34, uniform flow of conditioned air throughout the served space is assured. The conditioned air is discharged across the width of the served space 34, to side wall 28, and then it flows towards the second end 24, crossing back across the width of the truck body 16 as it nears the second end 24 as it is drawn into the return air opening 50.

The return air duct 38 defines a substantially rectangular cross-sectional configuration, with the width dimension in a direction between sides 26 and 28 of served space 34 preferably being wider than a depth dimension measured vertically. The bottom of the air return duct 38, adjacent to the second end 48, defines a downwardly facing opening 52 which is closely adjacent to the downwardly facing opening 44 to air supply duct 36.

Refrigeration unit 20 includes an evaporator section 54, a condenser section 56, and refrigeration control 58. The condenser section 56 may be below the evaporator section 54, as illustrated, or along side it, as desired. Evaporator section 54 includes a discharge air duct 60 which defines an upwardly facing air discharge opening 62, with duct 60 being configured to snugly extend into the downwardly facing opening 44 of the air supply duct 36 when truck body is in the lowered first position shown in FIGS. 1 and 2. A suitable gasket (not shown) seals the interface. Alternatively, the telescopic coupling and air tight sealing action may be provided by configuring and dimensioning end 40 of the air supply duct 36 such that it extends downwardly into the duct 60 which defines the upwardly facing opening 62.

Evaporator section 54 also includes a return air duct 64 which defines an upwardly facing return air Opening 66, with duct 64 being configured to snugly extend into the downwardly facing opening 52 of the return air duct 38 when truck body 16 is in the lowered first position shown in FIGS. 1 and 2. A suitable gasket (not shown) seals the interface. Alternatively, the telescopic coupling and air tight sealing action may be provided by configuring and dimensioning a duct-like extension to surround and depend from the perimeter of opening 52 such that the depending extension of duct 38 extends downwardly into a gasketed air tight fit with duct 64 which defines the upwardly facing opening 66.

In the operation of refrigeration unit 20, which occurs only when truck body 16 is in its first or lowered position shown in FIGS. 1 and 2, conditioned air is discharged from the evaporator section 54 into the air supply duct 36, as indicated by arrows 68, directing conditioned air, indicated by arrow 70, into the served space 34. The conditioned air then flows uniformly throughout the served space, being drawn towards the second end 24 of truck body 16, where it enters opening 50 to the air return duct 38, as indicated by arrows 72. The return air 72 then flows through the return air duct 38, entering evaporator section 54 via the return air opening 62.

When the truck body 16 is elevated, as shown in FIGS. 3 and 4 to serve an airplane, the telescopically engaged ducts of the truck body 16 and of the refrigeration unit or system 20 automatically separate or part. There will be no conditioned air circulated through truck body 16 while it is elevated, but doors of the truck body will be open anyway to remove the food, so the lack of circulating conditioned air during elevation of truck body 16 is not a disadvantage.

A truck body detector switch 74 is mounted on chassis 12 such that switch 74 is in a first condition, e.g., closed, when truck body 16 is in the lowered first position, and it changes from the first condition to a second condition, e.g., open, as soon as the scissors lift mechanism 18 starts to elevate truck body 16 towards the elevated second position. Switch 74 is connected to refrigeration control 58, with switch 74, when in its second condition, preventing operation of refrigeration unit 20. Thus, refrigeration unit 20 ceases operation as soon as the truck body 16 leaves chassis 12, conserving electricity or fuel, depending upon the type of prime mover used for driving a refrigerant compressor associated with unit 20. Refrigeration unit 20 is not shown in detail, as it may be conventional. U.S. Pat. Nos. 4,720,980 and 4,537,047, which are assigned to the same assignee as the present application illustrate truck refrigeration systems which may be used.

We claim:

1. A refrigerated truck, comprising:
a chassis having support wheels,
a truck body,
means mounting said truck body on said chassis for movement of the truck body between first and second positions relative to said chassis, with said first position being adjacent to said chassis and with said second position being above said first position,
a refrigeration system mounted on said chassis for providing conditioned air for said truck body,
and first and second air duct means associated with said refrigeration system and with said truck body, respectively, with said first and second air duct means being coupled in the first position of said truck body, and separated in the second position of said truck body.

2. The refrigerated truck of claim 1 wherein the means mounting the truck body on the chassis is a scissors lift mechanism.

3. The refrigerated truck of claim 1 wherein the first air duct means includes first supply and first return air ducts, and wherein the second air duct means includes second supply and second return air ducts, with the first and second supply air ducts being sealingly engaged, and with the first and second return air ducts being sealingly engaged, in the first position of the truck body relative to the chassis.

4. The refrigerated truck of claim 3 wherein the truck body defines a served space having first and second ends, first and second sides, a floor and a ceiling, with the second supply air duct extending vertically upward along one of said sides adjacent to said first end, defining a downwardly facing air entrance opening below the floor and an air exit opening adjacent to the ceiling.

5. The refrigerated truck of claim 4 wherein the second return air duct extends horizontally below the floor of the served space, from the second end towards the first end, defining an air entrance opening adjacent to the second end which communicates with the served space through the floor, and a downwardly facing air exit opening adjacent to the downwardly facing air entrance opening of the second supply air duct.

6. The refrigerated truck of claim 1 including detector means for detecting when the truck body is not in the first position, and refrigeration control means responsive to said detector means for preventing energization of the refrigeration system when the truck body is not in the first position.

* * * * *